United States Patent
Hallberg

(10) Patent No.: US 9,561,977 B2
(45) Date of Patent: Feb. 7, 2017

(54) METHOD AND APPARATUS FOR DECREASING THE CONTENT OF IMPURITIES IN RAW WATER

(71) Applicant: 2Alfa Hydrotech AB, Tyresö (SE)

(72) Inventor: Rolf O. Hallberg, Tyresö (SE)

(73) Assignee: 2Alfa Hydrotech AB, Tyresö (SE)

( * ) Notice: Subject to any disclaimer, the term of this patent is extended or adjusted under 35 U.S.C. 154(b) by 0 days.

(21) Appl. No.: 14/429,290

(22) PCT Filed: Jun. 27, 2013

(86) PCT No.: PCT/SE2013/050806
§ 371 (c)(1),
(2) Date: Mar. 18, 2015

(87) PCT Pub. No.: WO2014/209183
PCT Pub. Date: Dec. 31, 2014

(65) Prior Publication Data
US 2015/0232361 A1  Aug. 20, 2015

(51) Int. Cl.
*C02F 3/30* (2006.01)
*C02F 1/00* (2006.01)
(Continued)

(52) U.S. Cl.
CPC ............... *C02F 3/302* (2013.01); *C02F 1/001* (2013.01); *C02F 2101/103* (2013.01);
(Continued)

(58) Field of Classification Search
CPC ..... C02F 3/302; C02F 1/001; C02F 2101/203; C02F 2101/206; C02F 2101/20; C02F 2101/103; C02F 2101/163; C02F 2101/166; C02F 2103/06
(Continued)

(56) References Cited

U.S. PATENT DOCUMENTS

| 2007/0235387 A1* | 10/2007 | Hallberg | ................ B09B 1/006 210/610 |
| 2008/0251448 A1* | 10/2008 | Kent | ....................... C02F 3/306 210/602 |
| 2010/0282653 A1* | 11/2010 | Korzeniowski | .......... C02F 3/12 210/151 |

FOREIGN PATENT DOCUMENTS

| KR | 10-2011-0139564 A | 12/2011 |
| WO | WO 96/32210 A1 | 10/1996 |

(Continued)

*Primary Examiner* — Fred Prince
(74) *Attorney, Agent, or Firm* — Blank Rome LLP

(57) ABSTRACT

The present invention relates to a method for decreasing the contents of metals, metalloids, nitrate and nitrite, respectively, in raw water flowing through a basin (1), whereby water containing either oxygen, oxygen-releasing substances, naturally occurring micro-organisms and/or substrates therefore is intermittently introduced to the basin (1) through horizontally arranged infiltration/extraction means (2) above and below the injection pipes of raw water, and by alternating the withdrawal and infiltration of conditioned water between the horizontal means so that essentially a vertical flow of water is created between these means, thereby creating a reaction zone for purification of raw water before it reaches the central extraction well. The water to be purified is fed into the basin by horizontally arranged feeding pipes (5) and the extraction of purified water from said at least one extraction well (3) is such that a substantially negative pressure is created around said at least one extraction well (3). The invention relates also to an apparatus for carrying out the method.

7 Claims, 2 Drawing Sheets

(51) Int. Cl.
  *C02F 101/20*   (2006.01)
  *C02F 101/10*   (2006.01)
  *C02F 101/16*   (2006.01)
  *C02F 103/06*   (2006.01)

(52) U.S. Cl.
  CPC .. *C02F 2101/163* (2013.01); *C02F 2101/166* (2013.01); *C02F 2101/20* (2013.01); *C02F 2101/203* (2013.01); *C02F 2101/206* (2013.01); *C02F 2103/06* (2013.01)

(58) Field of Classification Search
  USPC ............... 210/605, 616, 617, 150, 151, 252, 259,210/260, 912
  See application file for complete search history.

(56) References Cited

FOREIGN PATENT DOCUMENTS

WO    WO 02/48469 A1    6/2002
WO    WO 2006/014126 A1    2/2006

* cited by examiner

METHOD AND APPARATUS FOR DECREASING THE CONTENT OF IMPURITIES IN RAW WATER

FIELD OF THE INVENTION

The present invention relates to a method for decreasing the contents of at least one impurity selected from the group consisting of metals, metalloids, nitrate or nitrite in raw water according to the preamble of claim 1 and to an apparatus according to the preamble of claim 4.

BACKGROUND OF THE INVENTION

As used herein, the term artificial ground water is used for infiltrated surface water, and by the term raw water is meant ground water, artificial ground water, or surface water.

In many places, potable water requiring treatment and purification for removal of iron and manganese is treated in a water treatment plant by adding oxygen to the water. This leads to precipitation of impurities, which are filtered out to leave purified water. Oxygen is typically added to the water in the form of pure oxygen, or by aeration of the water through the use of a cascade aerator. Because the concentration of oxygen necessary to precipitate metal ions from solution is comparatively low, iron and manganese are precipitated through the filtration process described above, wherein the filter encompassed one or more layers of sand through which the water is passed. Capital investment and operating costs for such a purification plant are high since the sand layers which function as the filter material must be regenerated from time to time to enhance the removal of the precipitated metal ions of manganese and iron.

Alternatively, ground water has been purified in situ as described in Swedish Patent Specification No. 6903544-2. Water containing oxygen or oxygen-releasing substances was introduced intermittently into an aquifer through a number of satellite wells or satellite pipes, arranged vertically at a predetermined distance and surrounding an extraction well or extraction pipe.

As used herein, the term "satellite wells" is used to indicate any means arranged vertically in an aquifer by which treated water may be introduced into a filter, basin, aquifer or similar purification or filtration system through which such water is to be purified. However, it is to be understood that "satellite wells" are also used to withdraw water for introduction into other satellite wells. Representative examples of satellite wells include wells, pipes, hoses, tubes and similar devices.

Oxygenated water introduced into an aquifer creates a suitable environment for the growth of certain microbes enhancing chemical and metabolic adsorption, oxidation and precipitation of compounds in the existing ground layers, thereby utilizing the ground layers as a reaction and filtration medium. The microbes employed are often organisms being active primarily in zones created between oxidizing and reducing conditions. Water containing oxygen or oxygen-releasing substances was added intermittently over a period of approximately twenty-four (24) hours. During the addition of oxygenated water or water containing oxygen-releasing substances, the extraction well could not be used as a purified water source since concurrent use of the extraction well and the satellite wells would cause the failure of the filtration mechanism or a disturbance in its operation, resulting in a deterioration of the quality of water. To extract water on a continuous basis, two or more extraction wells or suitable means for storage has been required to circumvent the above-described disadvantages, enabling the withdrawal of purified water to be alternated between at least two extraction wells or between the well and the storage means. Regeneration was performed on the dormant extraction well or wells if necessary during withdrawal of purified water from the alternate extraction source.

To eliminate the drawback with a discontinuous extraction of water another alternative of ground water purification in situ has been described in Swedish Patent Specification No. 8206393-4. An advantage of that invention is the elimination of the need for two or more extraction wells, permitting purified water to be pumped continuously from a single extraction well.

During the operation oxygenated/conditioned water is fed to at least one but less than all of the satellite wells, and simultaneously with such introduction, water is drawn from at least one satellite well for the purpose of creating a purification zone for the adsorption, transformation, oxidation, precipitation or volatilization of contaminants. In particular, water conditioned with oxidizing agents or other beneficial additives is utilized to reduce the concentration of impurities from untreated water, rendering the water "purified." The water fed to the satellite wells may consist of conditioned water drawn from at least one other satellite well and if desired also a portion of the purified water drawn from the extraction means.

By changing the plurality of satellite wells into which conditioned water is introduced, and by alternating the satellite wells from which water is withdrawn, the user optimizes the purification zone in which contaminants are precipitated. Any number of satellite wells greater than two may be used in this system, depending upon the size of the purification system, hydrogeologic conditions, biogeochemical conditions, the concentration of impurities contained in the water, etc. Conditioned water may be introduced into the satellite wells for a predetermined period, ranging from a few hours to a few days or longer.

The process according to Swedish Patent Specification No. 8206393-4 also enables the continuous filtration and purification of raw water utilizing a basin, wherein a filter comprised of naturally occurring or man-made material is contained and utilized. For example, soil may be excavated to form a basin-shaped cavity with a mantle surface, and a sealing layer of clay, concrete, plastic, water-resistant cloth or the like may be applied to the mantle surface to form an inner wall. Satellite wells for the introduction of conditioned water, are arranged vertically inside the mantle within the basin, and the basin is filled with a filter material, such as sand. The extraction means may be located in the centre of the basin; the satellite wells for introducing treated water are arranged between the mantle and the basin centre, around the interior of the periphery of the inner wall of the basin, so as to enable the introduction of conditioned water into the purification system through a plurality of the satellite wells, extraction of water through at least one satellite well and the continuous withdrawal of purified water through the extraction means. In the man-made aquifer, water is intermittently drawn from at least one satellite well, is conditioned and is further introduced into at least one other satellite well. Alternating the satellite wells used for recharge with the satellite wells used for withdrawal of water in this manner effectively alternates the purification zones utilized for the precipitation of contaminants.

WO02/48469 describes means and methods for purification of water, where these also can be used in an artificial aquifer, e.g. a basin filled with sand or similar material. In the description, the tightening cloth against the ambient soil is said to be arranged below the soil surface, which means that the top part is open against the atmosphere. The same arrangement is also true for the Swedish Patent Specification No. 8206393-4. This will give rise to an overflow and out wash of material from the basin because of the high water pressures that are built up in the basin from the infiltration of raw water and recharge into the satellite wells.

EP 04749194.9 describes a method for decreasing the contents of metals, metalloids, nitrate and nitrite, respectively, in raw water flowing through a basin containing naturally occurring filter material, whereby in case of decreasing the contents of metals or metalloids water containing oxygen or oxygen-releasing substances and/or metabolic reactions of naturally occurring micro-organisms and in the case of decreasing the contents of nitrate and nitrite water containing denitrification organisms and/or substrates therefore is intermittently introduced to the basin through a number of satellite wells arranged around at least one extraction well for purified water. The method is characterized in that said water containing oxygen or oxygen-releasing substances and/or metabolic reactions of naturally occurring micro-organisms or denitrification organisms and/or substrates therefore is homogeneously distributed by satellite wells arranged vertically in said basin, and the water to be purified is fed into the basin by horizontally arranged feeding pipes and that the extraction of purified water from said at least one extraction well is such that a substantial negative pressure is created around said at least one extraction well.

Moreover, according to said document the basin is hermetically sealed by a material impermeable to air and water and that all inlets and outlets through the material are impermeable to air and water.

When water is purified by passing through a reaction zone created by a plurality of satellite wells arranged vertically and surrounding an extraction well, the flow pattern from the satellite wells of injected water becomes generally parallel to the flow pattern of the water to be purified. When this generally parallel flow pattern is established, a discontinuous radial purification pattern develops between the satellite wells and between the satellite wells and the extraction well, resulting in that the raw water being poorly purified. This gradually reduces the operability of the extraction well due to precipitation of iron and manganese, which occurs in the aquifer within close proximity to the extraction well.

THE OBJECT OF THE PRESENT INVENTION

Water which has been oxidized or to which different spices have been added is herein termed conditioned water.

The object of the present invention is to eliminate the above-mentioned disadvantages in the in situ methods with conditioned water being distributed horizontally from vertical point sources (satellites), which is a common feature of the methods described above. The flow pattern of the conditioned water in such arrangements will be parallel to the raw water to be treated thereby obstructing a proper mixing between the conditioned water and the raw water which makes the chemical/biological purification of raw water less effective.

According to the invention this problem is eliminated when using two or more infiltration means for conditioned water arranged horizontally at least one above and at least one below the injection of raw water, and by alternating the withdrawal and infiltration of conditioned water between the upper and lower horizontal infiltration means so that essentially vertically flows of conditioned water between these infiltration means is created thereby distributing the conditioned water perpendicular to the flow of raw water. This will build up a larger and more effective treatment zone for the chemical/biological processes over a greater portion of the aquifer/basin. Also the number of inlets through the impermeable membrane is minimized drastically, which eliminates possibilities of leakage of water through the membrane. Likewise the satellite wells and their pumps are eliminated making the construction easier and the process more cost-effective.

BRIEF DESCRIPTION OF THE DRAWINGS

By way of a non-limiting example the invention will be described below with reference to the accompanying drawings, in which.

DESCRIPTION OF PREFERRED EMBODIMENTS

Figure 1:
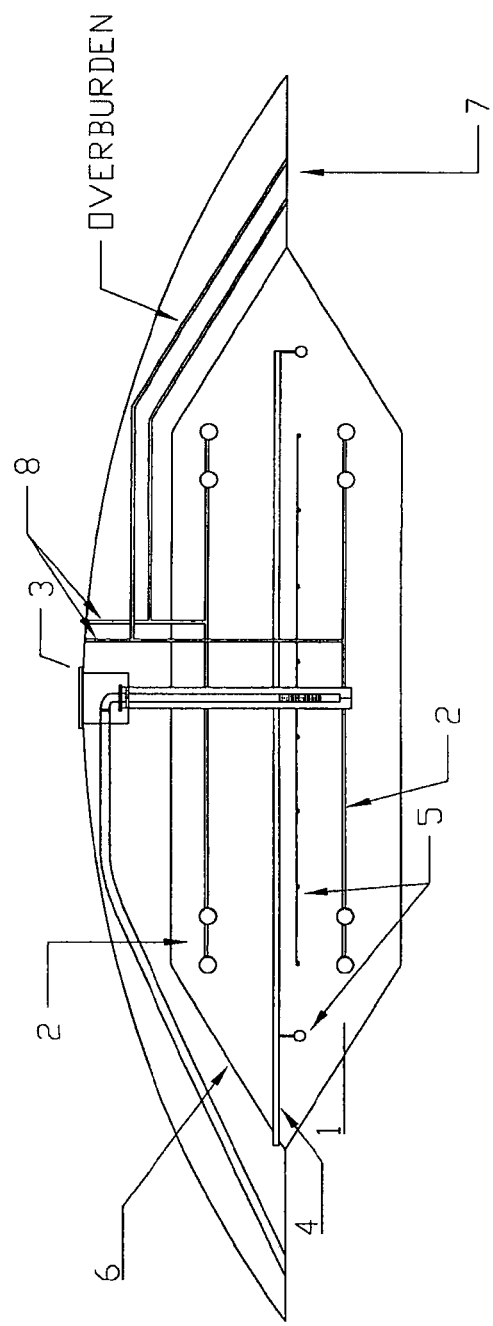
FIG. 1 is a schematic side view of an apparatus according to the invention for purification of raw water.

FIG. 1 shows an apparatus according to the invention in a preferred embodiment for decreasing the contents of at least one impurity selected from the group consisting of metals, metalloids, nitrate and nitrite in raw water, comprising a basin or artificial aquifer 1 provided in a cavity in the ground and containing naturally occurring filter materials, such as sand, or other suitable materials, not shown, at least one upper and at least one lower horizontally arranged infiltration means 2, at least one essentially centrally positioned extraction well 3, raw water injection pipes 4 for injecting water from, for instance, a ground water well, not shown, into horizontally arranged feeding pipes 5. Said horizontally arranged infiltration means 2 are substantially in parallel with said feeding pipes 5, and said at least one upper infiltration means 2 is placed above said feeding pipes 5 and said at least one lower infiltration means 2 is placed below said feeding pipes 5, as seen in FIG. 1. The basin 1 is totally surrounded by a material 6 impermeable to air and water of, for instance, rubber and/or plastic material, i.e. a hermetically sealed basin 1. This is also true for the top part of the basin 1. Moreover, all inlets and outlets for pipes, cables and so forth provided through the material 6 are made impermeable to air and water. In said FIG. 1 the ground-level plan is denoted by 7.

In the embodiment shown the basin is covered by an overburden with a thickness of approximately one to two meters.

Figure 2:
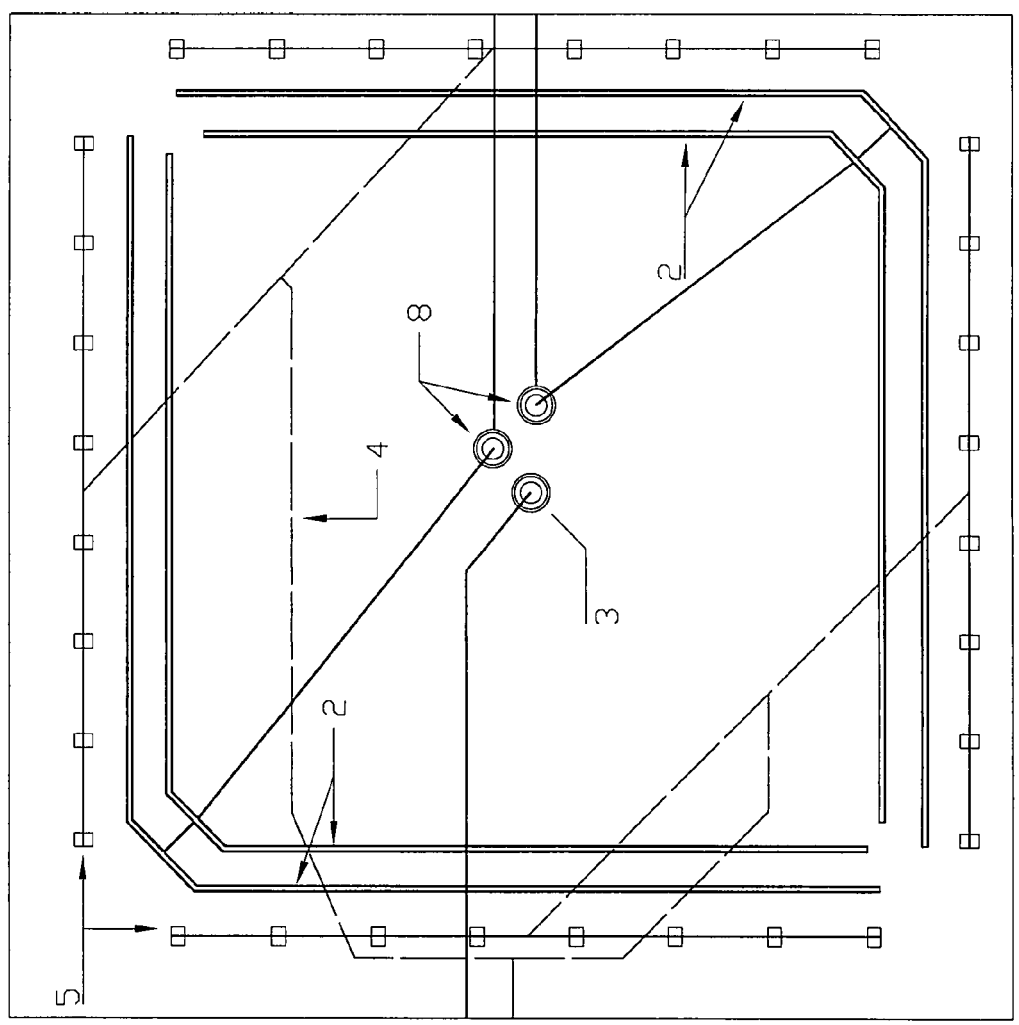
FIG. 2 is a schematic view from above of the apparatus according to the invention provided with a central extraction well and horizontal infiltration means arranged around said extraction well and in which feeding pipes and pipes for infiltration of raw water is shown by broken lines and with the covering overburden removed.

As can be seen in FIG. 2 in a particular embodiment the apparatus has the form of a square basin, but it is obvious that the basin can have any other form such as round or rectangular.

In the shown embodiment four infiltration means 2 are arranged parallel to each side of the basin 1. The raw water injection pipes 4 shown by broken lines are connected to at least one feeding pipe 5. Moreover, said at least one upper and said at least one lower infiltration means 2 are connected to a conditioning device not shown, outside the closed basin 1, for oxygenating the water taken out of at least one of said infiltration means 2 and after the water is conditioned it is fed back to the other of said infiltration means 2 and is infiltrated into the basin 1. By alternating the infiltration means used for withdrawal of conditioned water so as to regenerate/oxidize the same effectively creates the purification zone utilized for the precipitation of contaminants/ impurities.

Feeding conditioned water intermittently into the infiltration means 2 in this manner creates a purification/reaction zone at a distance sufficiently far from the extraction well 3 so as to avoid clogging of the extraction well, and maintain adequate flow to the extraction well through the purification zone.

When the method according to the invention is started the basin 1 filled with filter material is totally filled with raw water. Then the pumping of water from the extraction well 3 is started and continuous to the water level around said extraction well 3 has been lowered about one meter from the starting level. Raw water is fed through the raw water injection pipes 4 to the horizontally arranged feeding pipes 5 with a total volume corresponding to the volume taken out through the extraction well 3, whereby the distribution of the water pressure in the basin 1, is obtained. Should no further measures be taken, then by time the natural course will level out the lowering of the water level around the extraction well 3 and large water pressures would arise to unacceptable high levels in the peripheral parts of the basin 1. To avoid this it is necessary to automatically control flowing in and flowing out of the water so that the lowering around the extraction well 3 is maintained. This special method of pumping, requiring a control and adjustment devise, not shown, is designed in such a way that it always prevail a high negative pressure around the central extraction well 3.

Thus, according to the invention the overpressure under the impermeable material is compensated for by an overburden with a rather moderate thickness over the basin 1, since the water cannot rise more than to the impermeable material. The pressures that will arise will be about 0.5 meters water head. By providing the basin 1 with an impermeable material 6 which extends around the whole basin, also the purified water is screened off from possible impurities in the surrounding soil and air.

In the case oxygen is added through aeration this is done in such a way that the water is allowed to circulate through an aeration/conditioning system, not shown, outside the closed basin 1. This aeration system may be common to said at least two upper and lower infiltration means 2. Inlet means 8 connected to said at least one upper and said at least one lower infiltration means 2 are placed in the vicinity of the extraction well 3. The water from said at least one upper and said at least one lower infiltration means 2 is aerated in a common conditioning devise, not shown, whereupon a certain deaeration is made in a small tank, not shown, so that free air bubbles may escape to the ambient air. The water from the small tank is then distributed uniformly by pumping through valves to said at least one upper and said at least one lower infiltration means 2. This is repeated intermittently between said at least one upper and said at least one lower infiltration means 2.

When the invention is used to purify raw water using the technology described herein, it is also possible to use the metabolic reactions of naturally occurring micro-organisms as the mechanism by which precipitation or degradation of contaminants occurs. Hence, naturally occurring micro-organisms serve in part as one means by which contaminated water may be purified utilizing the invention.

The filter material in the basin 1 does not need to be changed or regenerated for removal of precipitated iron and manganese or other metals or metalloids, since the porosity of the filter material preferably is dimensioned for a life time of more than 100 years before clogging of the filter material will lead to a reduction in pumping capacity from the extraction well 3.

The invention has been described above for removal of iron and manganese, but it is obvious to the artisan that it also can be used for removal of other metals or metalloids such as lead and arsenic.

Since the basin 1 according to the invention forms a hermetically closed system it is also possible to use processes requiring the absence of oxygen. The infiltration means 2 may instead of infiltration of oxygenated water be used for infiltration of necessary nutrients for the micro-organisms living under anoxic conditions. Such nutrients may consist of phosphates and substances of low molecular weight such as alcohols. In such a process nitrate and nitrite are converted to nitrogen which is made by using denitrification organisms, and the nitrogen will follow the water taken out of the extraction well 3. This water has to be aerated to remove the free nitrogen gas.

In the case it is desirable to remove both metals, metalloids and nitrate and nitrite, respectively, from the raw water at the same time, this can be done in at least two steps, whereby nitrite and nitrate are removed first in a basin comprising one or several separately arranged modules by feeding nutrients but not oxygen to at least a first module and then oxygen or oxygen-releasing substances to at least a second module. The water from the first module(s) may be feed to the second module(s) without any intermediate treatment. Of course the two step purification of the raw water can also be made in separately arranged basins 1.

The invention claimed is:

1. A method for decreasing the contents of at least one impurity selected from the group consisting of metals, metalloids, nitrate and nitrite in raw water supplied to a hermetically sealed basin through in the basin horizontally arranged feeding pipes so as to flow through said basin containing naturally occurring filter material, whereby in case of decreasing the contents of metals and/or metalloids water containing oxygen or oxygen-releasing substances and/or metabolic reactions of naturally occurring micro-organisms and in the case of decreasing the contents of nitrate and/or nitrite water containing denitrification organisms and/or substrates therefore, termed conditioned water, is intermittently introduced to the basin through at least two infiltration means, said at least two infiltration means is also used for periodically withdrawing said conditioned water so as to regenerate said conditioned water, whereby water having decreased content of said at least one impurity is extracted by at least one vertically arranged extraction well and the extraction of said water being such that a constant negative pressure is created around said at least one extraction well, comprising the steps of arranging said at least two infiltration means by placing at least one horizontally above and at least one horizontally below said horizontally arranged feeding pipes, and alternating withdrawal and infiltration of said conditioned water between said at least two infiltration means so that essentially a vertical flow of water is created between these means, thereby enhancing the mixing between conditioned water and raw water to make the reaction between these waters more effective and distributing precipitation of impurities over a greater portion of the basin.

2. The method according to claim 1, wherein the raw water is selected from the group consisting of ground water, artificial ground water and surface water.

3. The method according to claim 1, wherein the metals and metalloids are selected from the group consisting of iron, manganese, lead, and arsenic.

4. An apparatus for decreasing the contents of at least one impurity selected from the group consisting of metals, metalloids, nitrate and nitrite in raw water supplied to the apparatus, which comprises a hermetically sealed basin comprising naturally occurring filter materials, at least two infiltration means, at least one essentially centrally positioned extraction well, and raw water injection pipes for injecting the raw water into horizontally arranged feeding pipes, whereby conditioned water, i.e. water which has been oxidized or to which different spices have been added, is intermittently introduced to the basin by said at least two infiltration means, wherein said at least two infiltration means are arranged in a way that at least one is placed horizontally above and at least one is placed horizontally below the horizontally arranged feeding pipes and substantially in parallel with said feeding pipes.

5. The apparatus according to claim 4, wherein the hermetically sealed basin is totally surrounded by a material impermeable to air and water, said the material being made of rubber and/or plastic material.

6. The apparatus according to claim 4, wherein the raw water is selected from the group consisting of ground water, artificial ground water and surface water.

7. The apparatus according to claim 4, wherein the metals and metalloids are selected from the group consisting of iron, manganese, lead, and arsenic.

\* \* \* \* \*